Dec. 14, 1971  YOSHIRO OHKAWA  3,626,649
PREFABRICATED HOUSE

Filed July 17, 1970  13 Sheets-Sheet 1

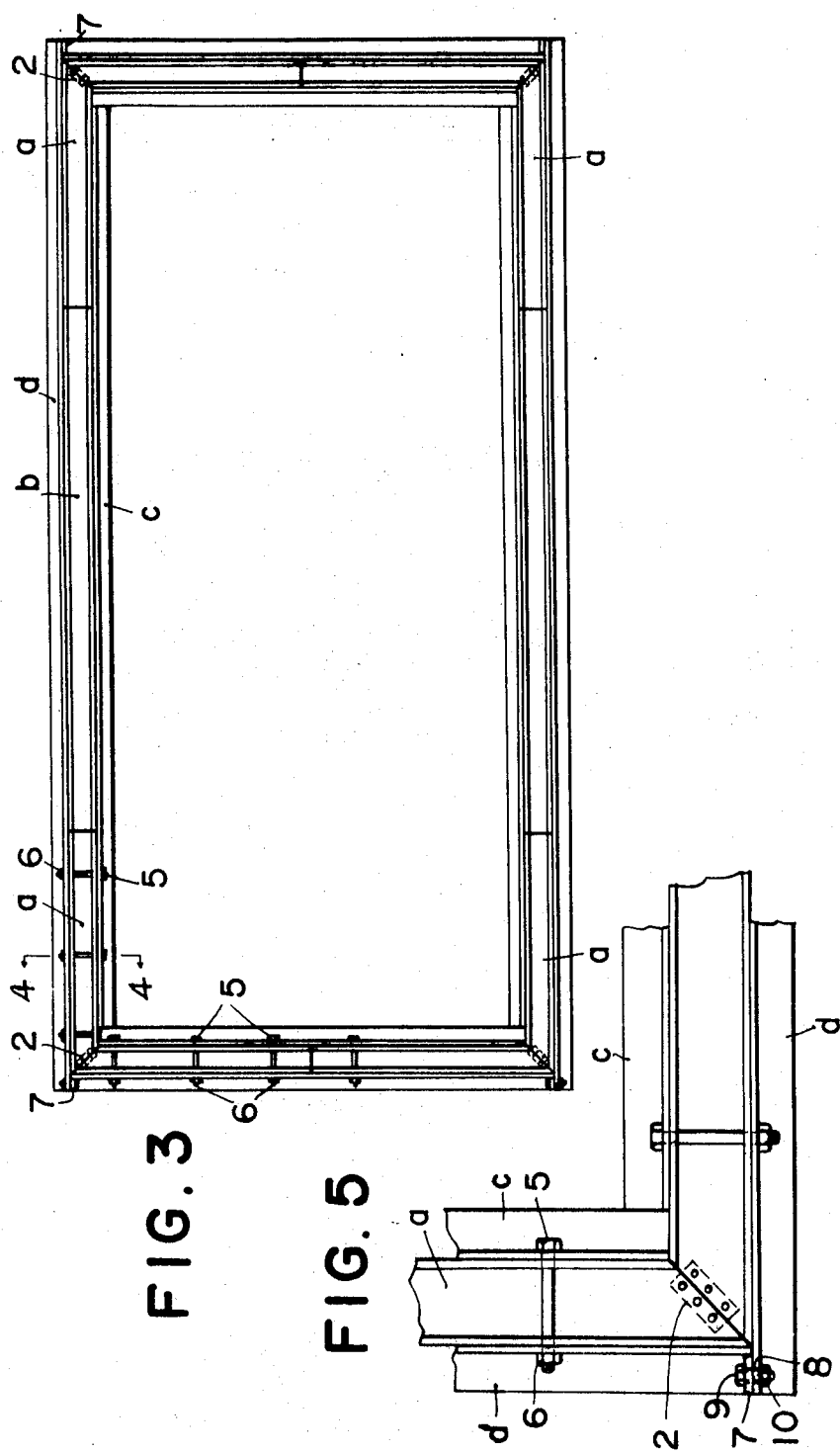

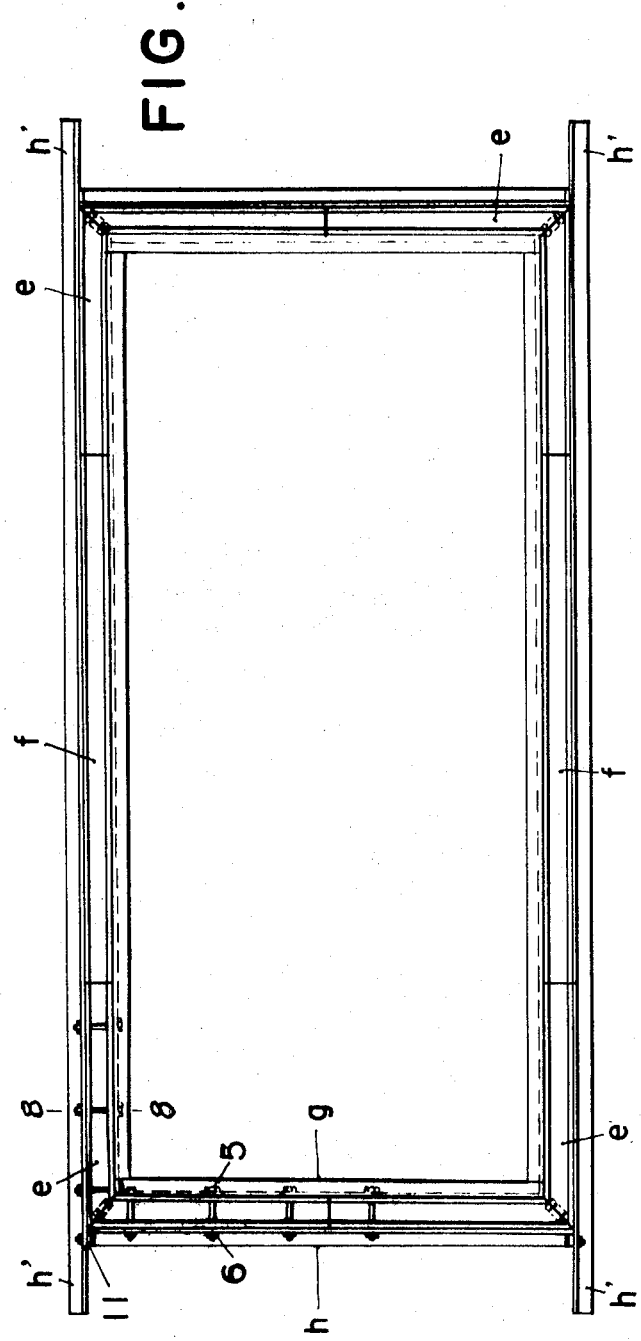

Dec. 14, 1971  YOSHIRO OHKAWA  3,626,649
PREFABRICATED HOUSE
Filed July 17, 1970  13 Sheets-Sheet 5
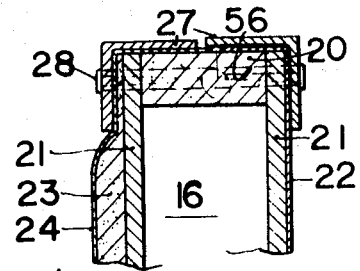
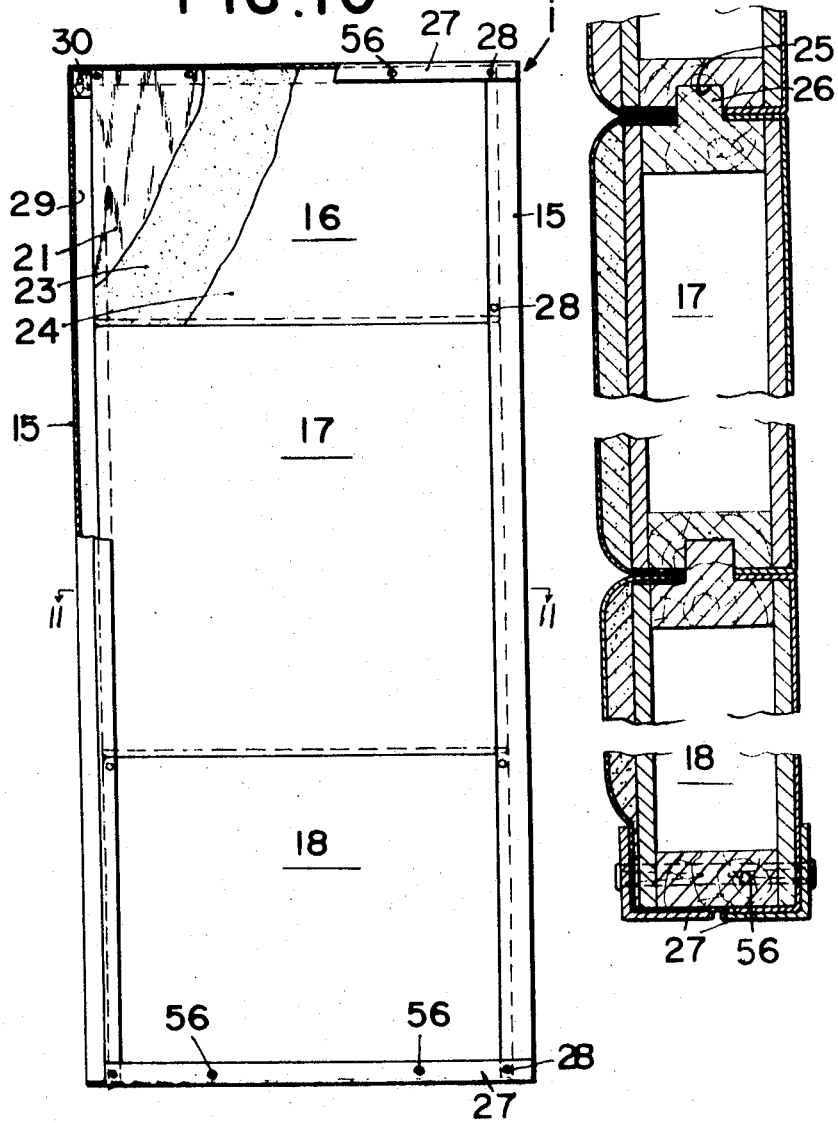

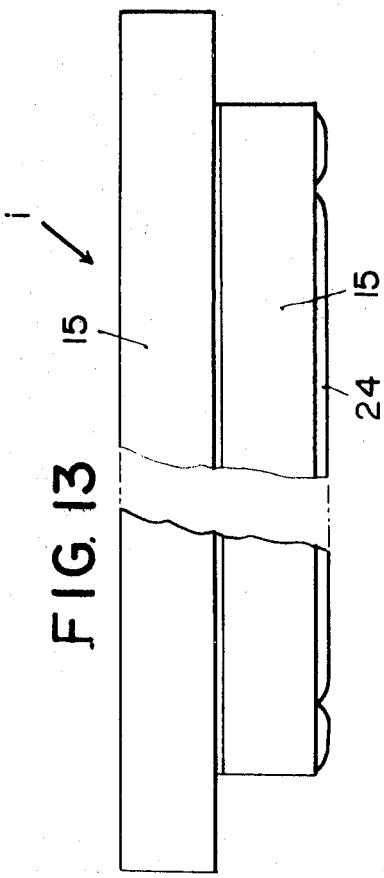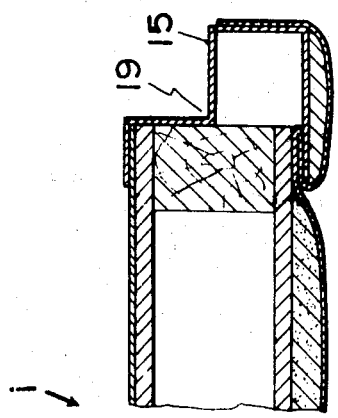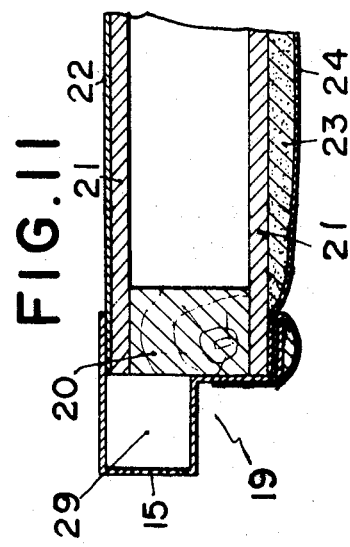

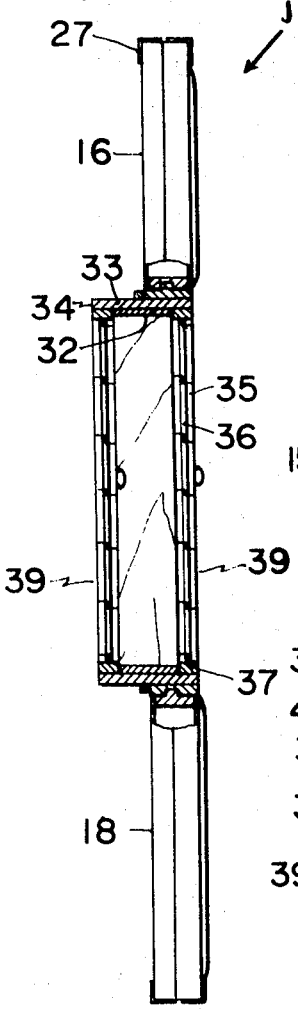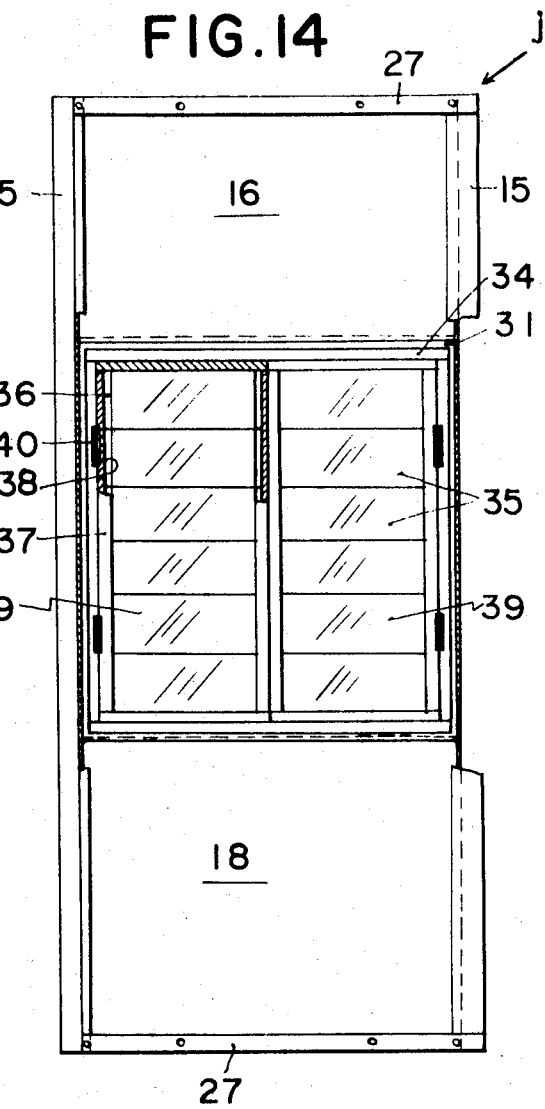

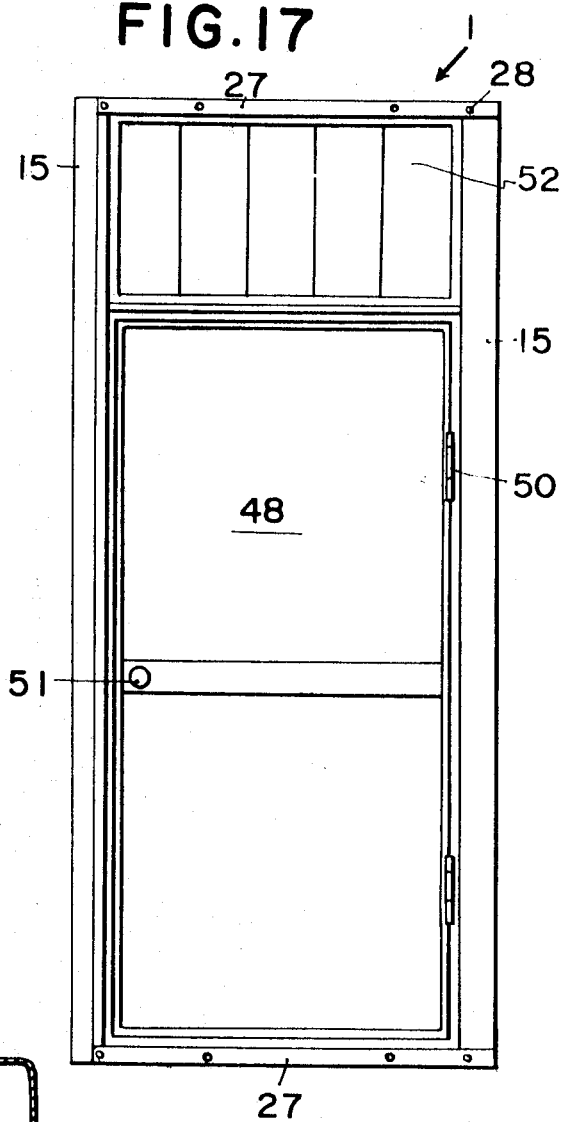
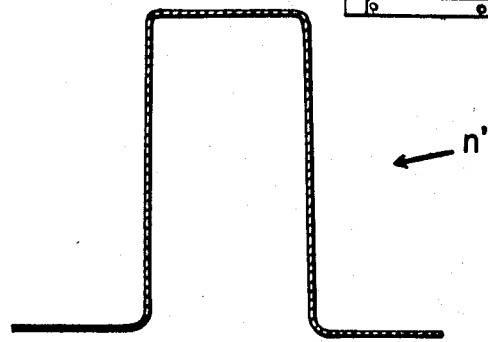

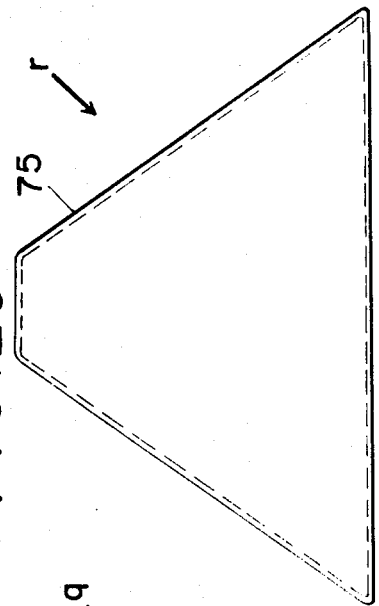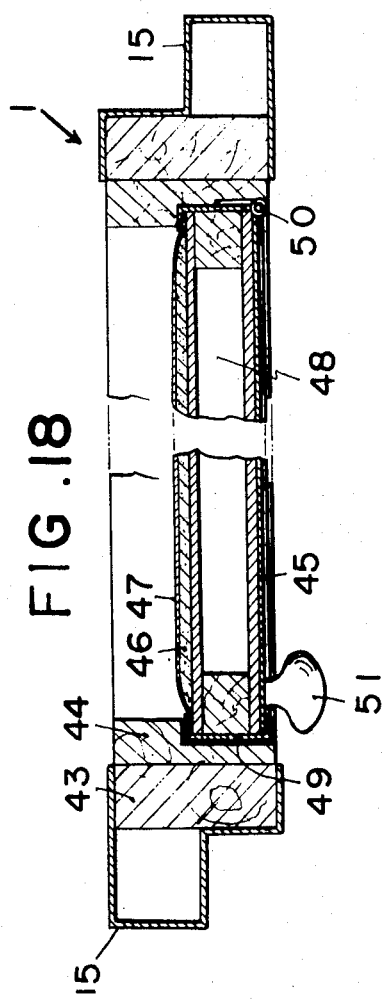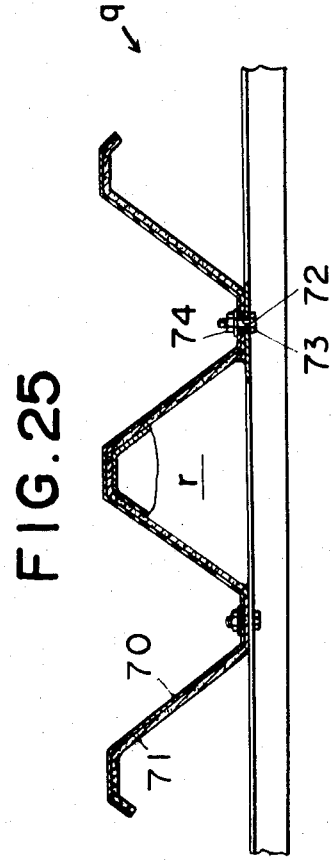

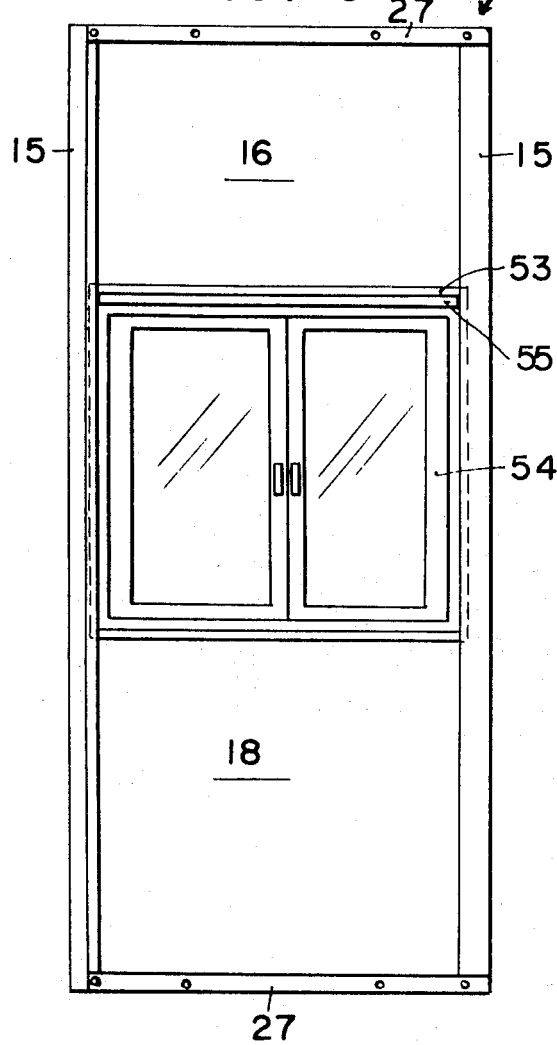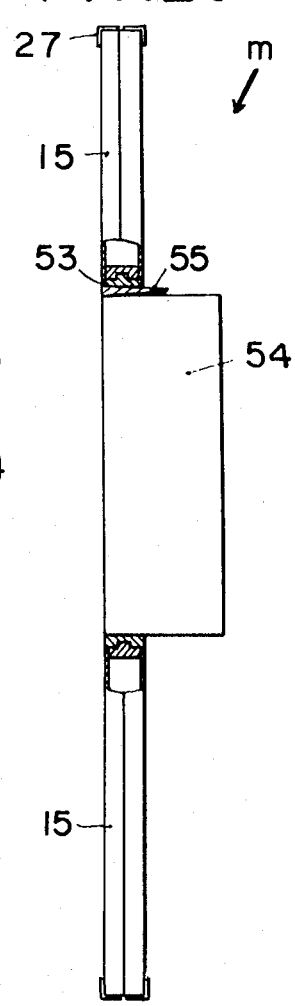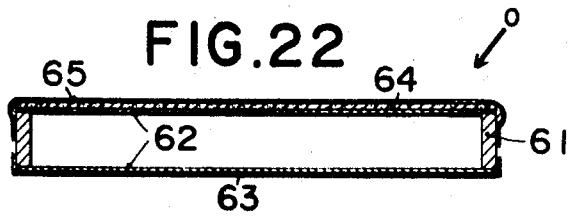

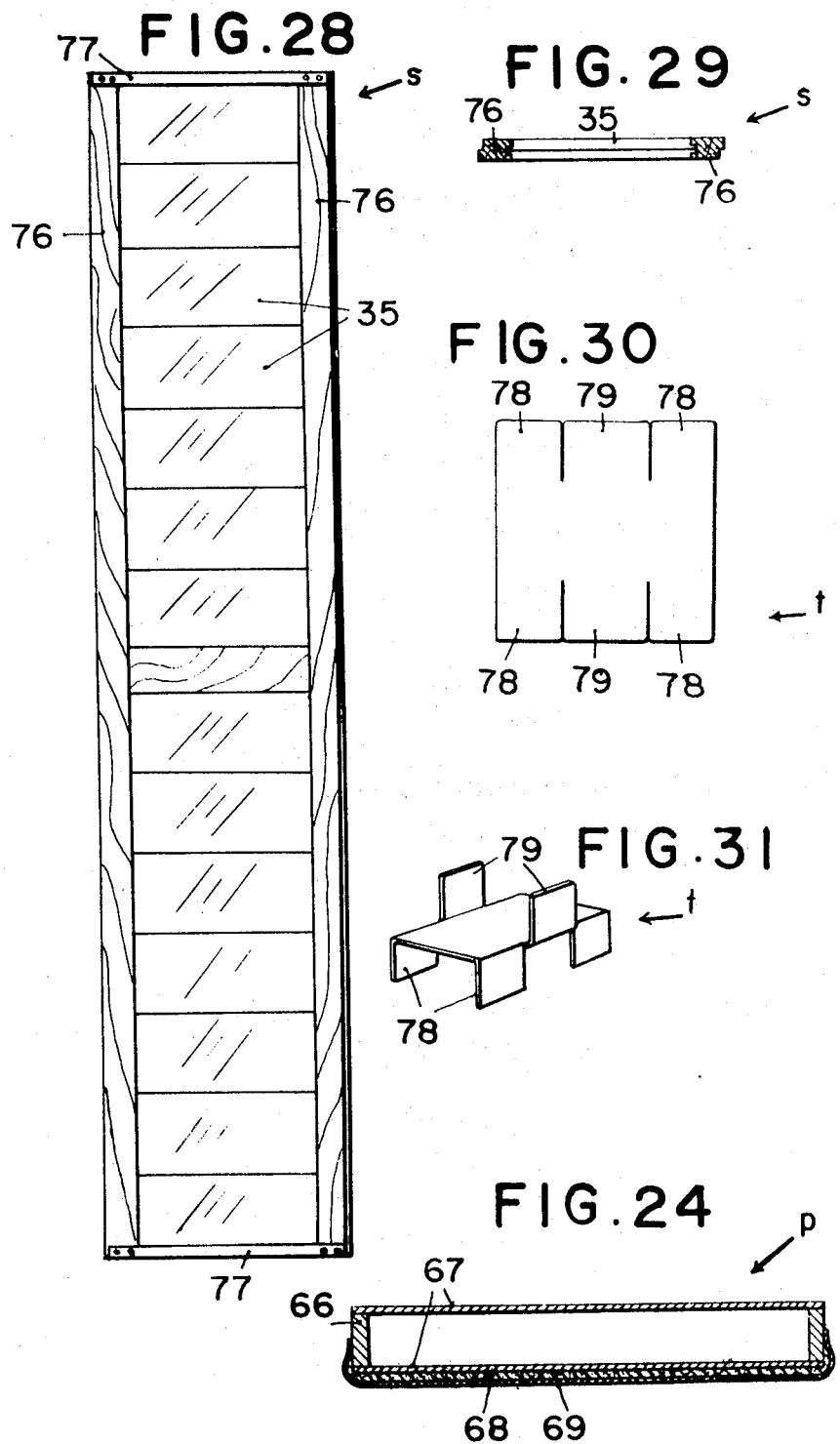

3,626,649
PREFABRICATED HOUSE
Yoshiro Ohkawa, 2-2-6-404 Asahigaoka, Kiyosemachi,
Kitalamagun, Tokyo, Japan
Filed July 17, 1970, Ser. No. 55,646
Claims priority, application Japan, Apr. 9, 1970,
45/33,656
Int. Cl. E06b 1/04
U.S. Cl. 52—204     12 Claims

ABSTRACT OF THE DISCLOSURE

This invention provides a prefabricated house, which is earthquake-proof, strong against wind, durable, comportable, and inexpensive. The house can be built easily in a short time by any person by assembling specific ready made parts, such as panels with steel sheet or aluminum for an outer covering and isocyanate foam material with leather cloth of selected color bonded thereto for an inner covering and channel and angle steel members used in combination as a groundsill and a top rail. After assembly, the rooms of the house are kept airtight, coldproof, and cooler, and furthermore, by reason of the panel construction, the whole building is protected from any partial distortion or collapse by tension and compression.

BACKGROUND OF THE INVENTION (a) Field of the invention

This invention relates to building construction and in particular to prefabricated houses.

(b) Description of the prior art

The principle of panel construction is utilized for the construction in accordance with this invention.

In prior art panel construction, basic panels manufactured in plants are assembled and interior and exterior finish work must be done by carpenters or building workers at the building location, and therefore, it is not possible to build a comfortable house easily in a short time by assembling such panels by unskilled persons.

On the other hand, emergency houses built in a short time by assembling at set of parts provided in case of calamities are for only temporary use and not suitable for long-term use. Such houses are poor in interior finish and appearance and lack habitability.

To eliminate such disadvantages of conventional panel construction as described above, this invention permits easy assembling of a set of parts into a house of good habitability in a short time by any person with no tools other than spanners for fastening bolts and nuts by which the parts are secured together.

To achieve this object, special improvements have been made in the panels, groundsill, top rail, flooring, ceiling, and roofing.

SUMMARY OF THE INVENTION

A prefabricated house in accordance with this invention and constructed as described below, can be built, disassembled, and transported easily and is beautiful, comfortable to live in, heat insulated, soundproof, and highly resistant to earthquakes and strong wind.

As a groundsill, there as used corner channel steel members composed of two channel steel members each cut at one end at 45° and jointed to form a right angle at such cut ends by being fixed to a hinge on the backs of the channels so that they can be folded back-to-back and unfolded to a right angle at the hinge. These corner members are put on foundation blocks at the four corners of a building site and are joined by connecting channel steel members used between such corner channel steel members according to the building area. Such corner and connecting channel steel members have holes in such positions as to correspond to fastening holes made in the upper and lower edges of outer wall panels to be described hereinafter. To the inner and outer sides of such corner channel steel members are attached angle steel members, which have holes in such positions as to correspond to holes made in said corner and connecting channel steel members. The members are fastened temporarily with bolts and nuts on the outer side, the bolts being inserted through corresponding holes from the inner side. Outer angle steel members are joined at four corners with bolts and nuts, each bolt being inserted through a hole in a flange formed by erecting one side of one angle steel member and a hole in the side facing the flange of other angle steel member. In this manner the groundsill is constructed.

A top rail is formed on the upper end edge of outer wall panels after fixing them on the groundsill. For convenience of explanation the top rail will be first explained.

The top rail is formed of the same kind of corner and connecting channel steel members as the groundsill, the channels being arranged so as to face the groundstill. To the inner side of such corner and connecting channel steel members are attached unequal-sided angle steel members each having one side a little wider than the height of said channel members with the angle portion a little lower than the lower edge of said channel steel members. To the outer side of said channel steel members are attached other steel members with the upper face level therewith. Such angle steel members are combined reversely to each other with the corner and connecting channel steel members secured therebetween by fastening them with bolts and nuts, the bolts being inserted from the inner side through holes in the corner and connecting channel steel members in the same positions as those in the groundsill and holes in the inner and outer angle steel members registering with such holes.

The outer angle steel members are joined with one another by fastening them with bolts and nuts, the bolts being inserted through holes in a flange formed by erecting one side end of one angle steel member and in the side of other steel member in contact therewith. The outer angle steel member crossing at a right angle with the short side of the top rail is extended by a specific length to form a stay for supporting roofing members.

Outer wall panels may be used as intermediate panels, window panels, wiring panels, and door panels. An outer wall panel for ordinary use is composed of two frames, right and left, each being of channel cross section and having a lap joint formed thereon by bending metal sheet to the required shape and a plurality of panel forming plates inserted therebetween. The space between the protruding portion of the lap joint of the frame and the side edges of the panel forming plates forms a pipe-like space, which may be closed by wood blocks at the upper and lower ends for preventing rain water from entering.

The panel forming plates are preferably composed of front and back waterproof plywood sheets attached to a rectangular wooden frame. The outer face is covered with sheet plastic or metal for example an enameled iron sheet while the inner face is covered with foam plastic, for example isocyanate foam material, with flexible decorative sheet material, for example leather cloth, bonded thereto. The upper and lower edges of the upper and lower panel forming plates are secured between angle steel members arranged in such a manner as to form a channel and secured to the side frame members.

A panel to be used as a window panel is the same as the intermediate outer wall panel except that a window frame is mounted instead of one or more of the panel forming plates. On this window frame a pair of windows are mounted by hinges. The windows are formed of hollow panes of transparent or semitransparent synthetic resin and mounted in a wood frame.

A wiring panel is composed of side frames and panel forming plates combined therewith as in said intermediate panels, with electric wiring passed through a tubular space inside the frames with suitable wiring means such as switches and outlets provided on the inner side of the frame or adjacent panel forming plates.

Frames for flooring and ceiling are so shaped as to have flanges on the both sides of a channel steel. A floor panel for flooring is composed for example of a square wooden frame having waterproof plywod sheets attached to both sides. A plastic or metal sheet, for example an enameled iron sheet is attached to the back for protection against humidity. A suitable floor covering, for example carpet or plastic or ceramic tile, or plastic foam covered with leather cloth, is bonded to the upper face.

A ceiling panel is the same in structure as said floor panel, except that no plastic or metal sheet is bonded to the upper face and suitable ceiling covering, for example acoustic tile or foam material with a suitable paper, plastic or fabric covering, is bonded to the lower face.

As a roofing material there is used steel sheet so bent as to have a channel cross section of trapezoidal shape and preferably covered with isocyanate foam material or other insulation bonded to the back for sound and cold proofing and heat resistance. In spaces between such roofing material and the top rail closing caps made of transparent or semitransparent synthetic resin are inserted with a force fit.

A partition panel is composed of frames and hollow blocks set therein. The blocks are made of semitransparent or opaque synthetic resin. The partition panel is used to partition a room interior at any desired point by inserting it into a channel of the ceiling frame and holding the lower end by a clip. Such building parts as described above may be put on the market as a set of parts, as many as required for any building area.

The building parts are easily assembled by unskilled persons using only wrenches to construct a complete house. As will be described more fully below, the groundsill parts are assembled on a foundation, outer wall panels are assembled on the groundsill and the top rail is assembled on top of the side panels, which support the top rail ceiling and roof so that no supporting pillars or columns are required. The flooring, ceiling and roof are then installed, the floor being carried by the inner angle members of the groundsill and the ceiling and roof being supported by the inner and outer angle members respectively of the top rail. Interior partitions are then set up to divide the interior of the building as desired. The building as then assembled is completely finished with exterior covering on the outer walls, interior covering on the inner wall surfaces, finished partitions, finished ceiling and floor covering. Even the electric wiring is incorporated in suitable panels.

In accordance with this invention corner channel steel members to form a groundsill and a top rail can be folded and unfolded on hinges, and each angle steel member is straight without any projection from the side face. They can be packed and transported very easily. A panel is composed of frames and panel forming plates set therein. It is therefore unnecessary to change a panel for a new one in case one of such plates is damaged. Only the damaged portion may be replaced. Such panel forming plates are made smaller in size and suitable for home industry. Isocyanate foam material with leather cloth bonded thereto, which is attached to the inner surface of outer wall panel, floor panel, and ceiling panel, keeps each joined portion air-tight and has a good feel due to its elasticity. The interior can be made very beautiful with colorful leather cloth. Ceiling and floor frames not only receive panels but also serve as supports between outer wall panels to withstand external pressure. Channels of ceiling frames are directed downward for partitioning. The upper end of a partition panel is inserted into one of such channels and the lower end thereof is held by a clip on the floor frames. Suitably colored enameled iron sheets attached to outer wall panels and to the back side of floor panels are highly resistant to humidity and fire.

Roofing members with isocyanate foam material bonded to the underide are coldproof, heatproof, and soundproof for reducing sounds, which may be otherwise produced by a beating rain or hail. There is no feat at all of the leakage of rain into a room even when the effect of packing with isocyanate foam material has been lost, because the roofing members are fixed on the angle steel members outside the top rail, that is, not within the room but out of it. Closing caps force fitted into the spaces between the top rail and the roofing members prevent rain, sand and dust from coming under the roof.

BRIEF DESCRIPTION OF THE DRAWING

The accompanying drawings show by way of example one esmbodiment of a prefabricated house of this invention, wherein

FIG. 3 is a plan of a groundsill;

FIG. 4 is a cross-sectional view taken along line 4—4;

FIG. 5 is an enlarged plan view of the joined portion of angle steel members;

FIG. 6 is a bottom view of corner channel steel members;

FIG. 7 is a bottom plan view of a top rail;

FIG. 10 is a front view of an outer wall panel partly cut away;

FIG. 11 is a cross-sectional view of the same taken along line 11—11;

FIG. 12 is an enlarged vertical sectional view of panel forming plates;

FIG. 13 is a plan view of an outer wall panel used at four corners;

FIG. 14 is a front view of a window panel;

FIG. 15 is a side of the same partly cut away;

FIG. 17 is a front view of a door panel;

FIG. 18 is a side view of the same partly cut away;

FIG. 19 is a front view of a bookcase panel;

FIG. 20 is a side view of the same partly cut away;

FIG. 22 is a cross-sectional view of a floor panel;

FIG. 23 is an enlarged cross-sectional view of a ceiling frame;

FIG. 24 is a cross-sectional view of a ceiling panel;

FIG. 25 is a cross-sectional view of the portion where a roofing member is joined to the top rail;

FIG. 26 is a front view of a closing cap;

FIG. 27 is a vertical sectional side view of the same;

FIG. 28 is a front view of a partition panel;

FIG. 29 is a cross-sectional view of the same;

FIG. 30 is a plan view showing how to make a partition-holding clip;

FIG. 31 is a perspective view of the clip;

DESCRIPTION OF THE PREFERRED EMBODIMENT

Figure 1:
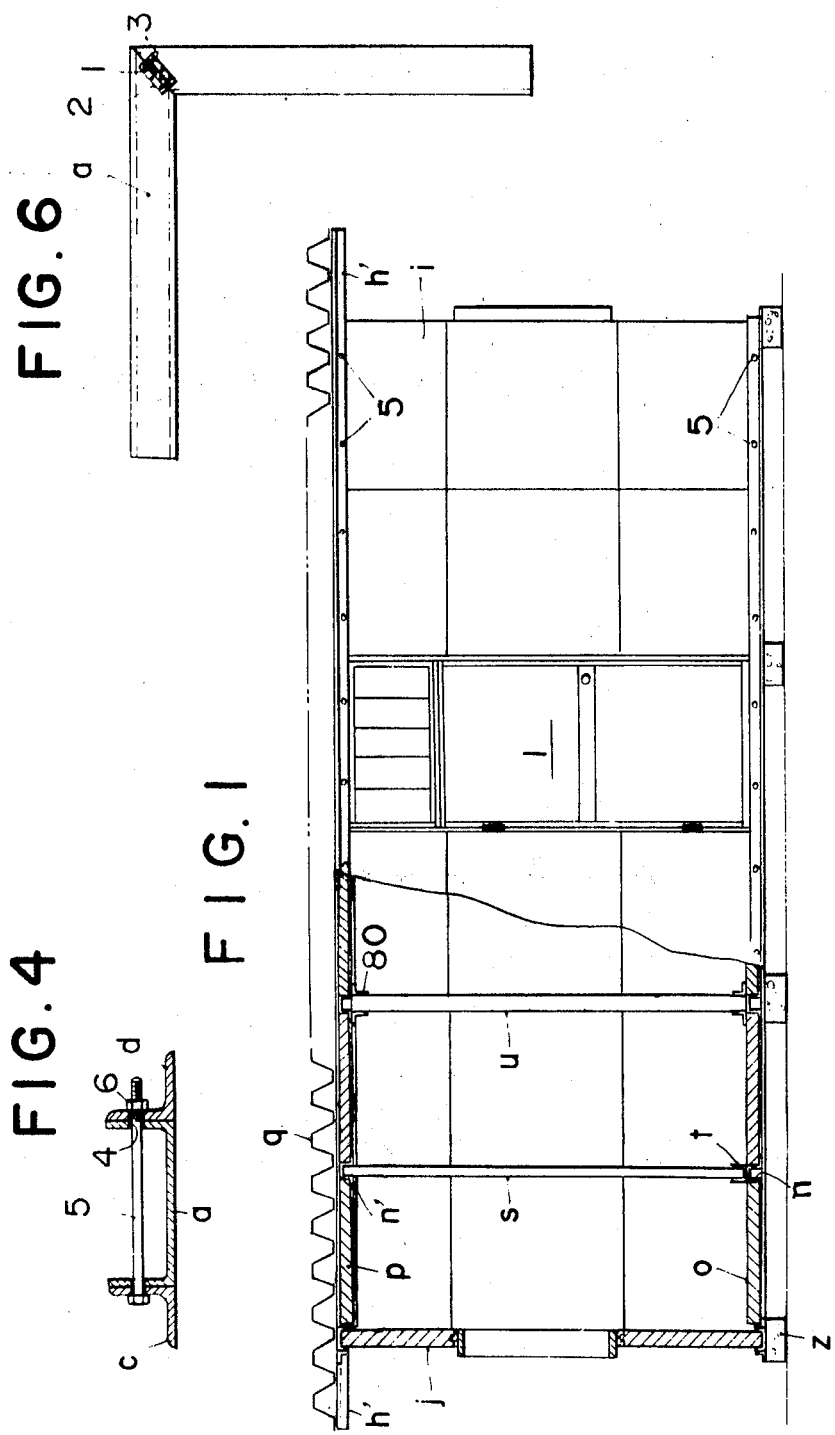
FIG. 1 is a front view, partly in section, of a prefabricated house in accordance with the invention.
Figure 2:
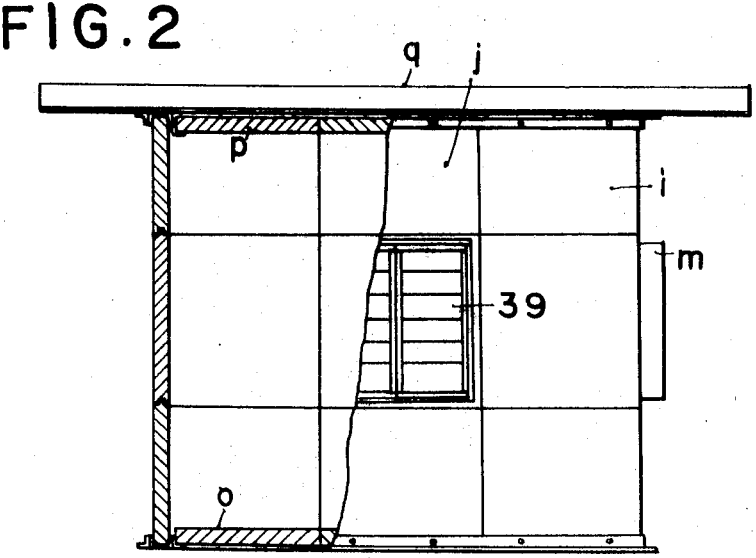
FIG. 2 is a side view partly in section of the same.

A prefabricated house having a frontage of 5.76 m. and a depth of 2.88 m. will be explained by way of a non-limiting example.

Two channel steel members each 1.44 m. long, 80 mm. wide, and 40 mm. high and cut at one end at a 45° angle are used as a groundsill (see FIGS. 3 to 6). The two channel members meet at the cut ends so as to make a right angle and have on the back of the abutting corner a hinge 2 having a hinge pin 1 and fixed to the channel members with rivets 3 so that the pin 1 extends along the abutting cut ends. Thus, a corner channel steel member $a$ is formed, which has aligned holes 4 in both of the channel side walls in such positions as to meet holes made in the front face of outer wall panels to be described hereinafter.

Such corner channel steel members $a$ are put at four corners on a foundation already provided at a building site after unfolding the channel steel members to form a right angle. In the direction of the depth of the house, two channel steel members $a$ abut directly with their respective alighed channels, while in the direction of the frontage, two connecting channel steel members $b$ each 1.44 m. long, 80 mm. wide, and 40 mm. high are put between the corner channel steel members and abut the corner channel members with their respective aligned channels. Angle steel members $c$ and $d$ of 40 mm. x 40 mm. are attached to the inner and outer sides respectively of these corner and connecting channel steel members $a$ and $b$. The channel members $b$ have holes 4 through both channel side walls in the same positions as those in outer wall panels. Each of the angle steel members $c$ and $d$ has holes 4 made in the same positions as those in the corner and connecting channel steel members.

These holes 4 are aligned and bolts 5 are inserted respectively through them from the inner angle steel members $c$ and are fastened temporarily with nuts 6 on the outer angle steel members $d$. The inner angle steel members $c$ abut at the four corners while the outer angle steel members $d$ are joined with bolts 9 and nuts 10, the bolts being inserted through holes 8 made in a flange 7 formed by erecting the end portion of one side of the outer angle steel member and in the side of the other member in contact with the flange 7. In this manner the four corner channel steel members $a$ and the connecting channel steel members $b$ are joined and at the same time the portions joined by the hingers 2 on the corner channel steel members $a$ are protected from being damaged owing to any overload, whereby the groundsill is formed.

Figure 9:
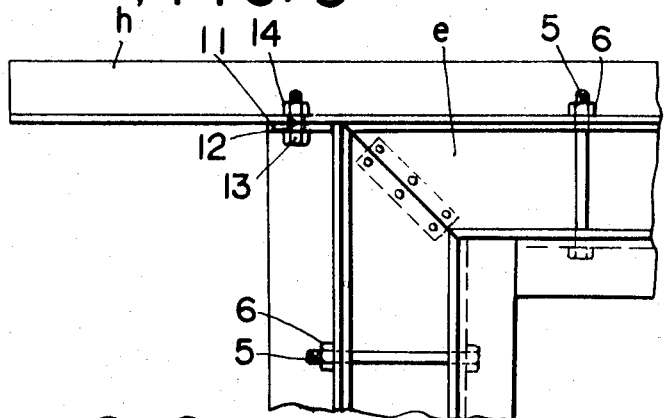
FIG. 9 is an enlarged plan view of the portion where angle steel members are joined.
Figure 8:
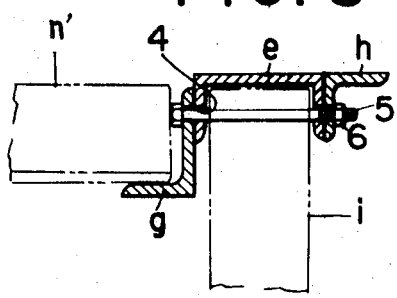
FIG. 8 is a cross-setcional view of the same taken along line 8—8.

As a top rail (see FIGS. 7 to 9) there are used corner channel steel members $e$ and connecting channel steel members $f$, which are symmetrical with the same in shape as the four corner channel steel members $a$ and the connecting channel steel members $b$ used as the groundsill as described above. Unequal-sided angle steel members $g$ of 65 x 40 mm. are used as inner members with the long side edge level with the corner and connecting channel steel members $e$ and $f$ and the short side edge lower than the low edge of the channel steel members, while equal-sided angle steel members $h$ for example of 40 x 40 mm. are used as outer members with the one side face level with the upper face of the channel steel members. These three steel members are joined by fastening temporarily with bolts 5 and nuts 6, the bolts passing through the holes 4 already made in the same positions as the holes 4 of the groundsill and extending from the inner unequal-sided angle steel members $g$ to the outer equal-sided steel members $h$, the ends of the inner members abutting one another at the four corners respectively. The outer angle steel members $h$ are joined at the four corners with bolts 13 and nuts 14, the bolts 13 being inserted through holes 12 made in a flange 11 formed by erecting one end portion of the one steel member $h$ and in the side face of the other s'eel member $h$ disposed in contact therewith. The angle steel member $h$ for a frontage of 5.76 m. is extended by about 547 mm., to form a support stay for roofing members.

An outer wall panel (see FIGS. 10 to 13) is formed of frames 15 70 mm. thick and 2.440 m. high used at right and left sides and three panel forming plates 16, 17, and 18 inserted therebetween. The frame 15 is made of a metal plate so formed as to have flanges on both sides and a channel in which the panel forming plates may be inserted. The channel forming portion is stepped to provide a laterally projecting portion forming a lap joint 19 with adjacent panels. Outer wall panels $i$ for ordinary intermediate use except those used at four corners are so arranged as to make lap joints 19 on both sides of the panel engaged with adjacent panels.

The panel forming plates 16, 17 and 18 are the same in structure. They are the same in width, for example 920 mm., but a little different in height. For example, the upper panel forming plate is 610 mm. high, the middle one 1050 mm. high, and the lower one 780 mm. high. Waterproof plywood sheets 21, 21 are attached with adhesive or nails to both surfaces of a wooden frame 20 formed in a square or rectangle.

The outer surface is covered with an enamelled iron sheet 22, and the inner surface is covered with isocyanate foam material 23 and colorful leather cloth 24 bonded thereto. The abutting edges of the panel forming plates 16, 17 and 18 have a long channel 25 and a tongue 26 engaged therewith. The individual enamelled steel sheets 22, isocyanate foam material 23 and leather cloth 24 are bent over the edges of the panels and bonded thereto for close contact between the panel forming plates (see FIG. 12.)

The outer and inner surfaces of the side frames 15, 15 in which the three panel forming plates are set are confined at the upper and lower ends by opposed angle steel members 27 embracing the upper and lower edges of the panels 16 and 18 respectively.

The opposed angle steel members 27 are joined with one another by machine screws 28 passing through aligned holes in the angles, the frames 15 and the panels. After the panel forming plates 16, 17 and 18 have been inserted into the channel on the side frame 15, a pipe-like space 29 is formed by the inner surface of the frame where the lap joint 19 projects. A wood block 30 is inserted in the upper end of such space to prevent rain water from flowing therein and to protect the space 29 from being deformed by shocks.

The outer wall panels $i$ used at four corners of the building are formed by using side frames 15 with the lap joints 19 disposed in the same direction as shown in FIG. 13 so that such panels may be combined at the four corners without trouble.

Figure 33:
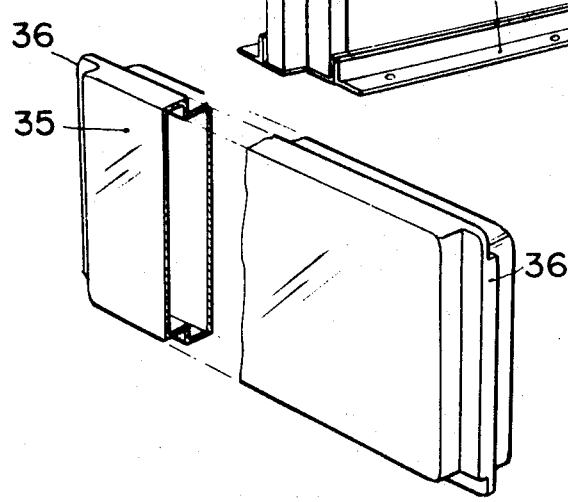
FIG. 33 is a perspective view of a window plate partly cut away.

As a window panel $j$ (see FIGS. 15 and 33) there is used an outer wall panel $i$ from which the middle panel forming plate 17 is removed and replaced by a frame 31 having the same external dimensions as those of said panel forming plate 17. Inside this frame 31 there is set a window mounting frame 34 having stepped portions made by attaching a board 33 to a plate 32 with adhesive or nails. Between the stepped portions in the window mounting frame 34, a pair of windows 39 are composed of units of hollow plates 35 made of synthetic resin by setting tongues 36 formed on the end faces thereof into vertical grooves 38 in the frame 37, and are mounted with hinges 40 so as to be free to open inwardly. Also on the board 33 forming the window mounting frame 34 outside the window 39 another pair of windows 39' the same as said window 39 are mounted with hinges 40 so as to be free to open outside. In this manner a double window is constructed.

Figure 16:
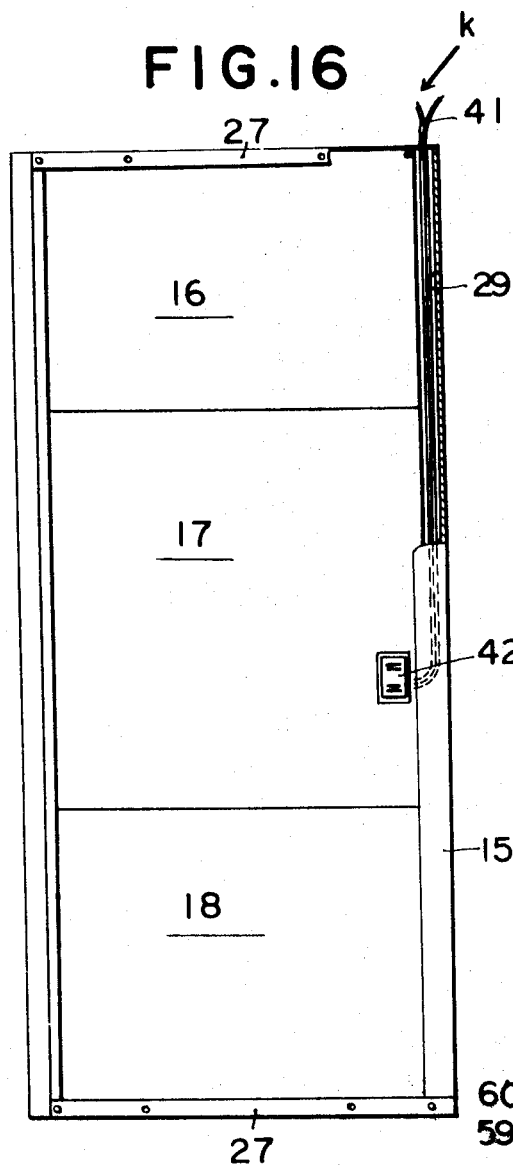
FIG. 16 is a front view of a wiring panel partly cut away.
Figure 21:
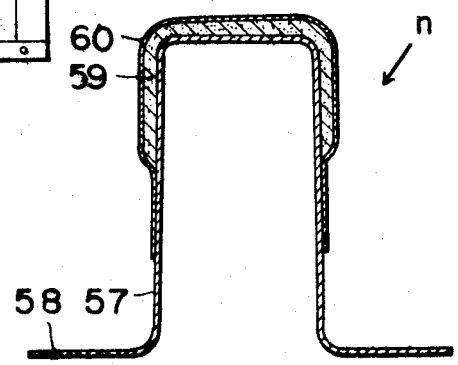
FIG. 21 is an enlarged cross-sectional view of a floor frame.

As a wiring panel $k$ (see FIG. 16) there is used an outer wall panel the same in structure as that $i$ for intermediate use, in which electric wires 41 are run through the inner space 29 in the frame. Wiring fixtures 42 such as switches and outlets are then mounted in suitable positions on the panel facing a room.

A door panel $l$ (see FIGS. 17 and 18) is composed of frames 15, 15 and a door frame 43 fixed thereto, in which a wooden frame 44 with stepped portions is set. The wooden frame 44 is supported by the upper and lower steel angles 27 as is the outer wall panel $i$ and the door frame 43 is fixed integrally with the frames 15, 15 with machine screws 28. In the stepped wooden frame 44, a door 48 is swung with hinges 50, the door having an enamel iron sheet 45 on the outer surface and isocyanate foam material 46 and leather cloth 47 bonded thereto on the inner surface with edges protected by a channel shaped edge cover 49 fixed thereon.

A handle 51 is mounted at the side of the door 48 opposite the hinges 50 and a latch and lock may be provided if desired. A transom window frame 52 is set in the upper section of the wooden frame 44 in which the door 48 is swung.

A bookcase panel m (see FIGS. 19 and 20) has a frame 53 set instead of the middle panel forming plate 17 as in the case of the window panel j. In this frame 53 there is set a bookcase 54 made of steel and having the same width as the inner width of the frame 53 and a height which is less by about 25 to 30 mm. The front face of the bookcase 54 is made flush with the inner face of the panel by setting it outward so that no space is occupied in the room. For fixing the bookcase 54 to the panel frame 53, a wedge 55 having a V-shaped cross section and the same width as that of the bookcase 54 is driven into a gap between the top of the bookcase 54 and the frame 53.

The inner faces of the frames 15, 15, facing the room, of the outer wall panel i, window panel j, wiring panel k, door panel l, and bookcase panel m are covered with isocyanate foam material 23 and leather cloth 24 bonded thereto so as to cover the heads of machine screws 28 and the metal face of the frame 15, and having holes 56 through which the bolts 5 are inserted to join the frames 15 to the groundsill and the top rail. The holes through the upper and lower edge angles 27 and are spaced by one-fourth of the panel width from the lateral edges of the panel. The holes 56 between adjacent panels are hence positioned so as to have the same distance therebetween, and holes on the groundsill and the top rail are made in corresponding spaced relation.

A floor frame n (FIGS. 21 to 24) is made of channel steel 57 with outwardly projecting flanges 58 provided integrally therewith at right angles to both its sides. The channel steel 57 is 60 mm. high, with the flanges 58 25 mm. wide, and the length long enough to allow parallel floor frames to be suspended between the angle steel members c attached to the corner and connecting channel steel member a and b at intervals of 94 mm.

The surface of the upper portion of the floor frame is covered with isocyanate foam material 59 and leather cloth 60 bonded thereto.

A rectangular floor panel o measures 914 x 920 x 65 mm. and is composed of a wooden frame 61, waterproof plywood sheets 62 attached to the upper and lower sides thereof, an enamelled iron sheet 63 covering the lower side of the panel and having edges bent up to the middle of each side of the wooden frame 61, and isocyanate foam material 64 and leather cloth 65 bonded thereto covering the upper side facing the room and having edge portions extending down over the upper half of the frame 61.

A celing frame n' is the same in size as the floor frame n except the surface is not covered with any material. It is arranged between the unequal-sided angle steel members g used inside the top rail in such a manner as to face the floor frame n. A ceiling panel p measures 914 x 920 x 60 mm. in a rectangular form and is like said floor panel o but without an enamelled iron sheet. In other words, it is composed of a wooden frame 66, waterproof plywood sheets 67 attached to the upper and lower sides thereof, and isocyanate foam material 68 and leather cloth 69 bonded thereto covering the lower side facing the room and extending up over each side of the wooded frame 66.

As a roofing member q (see FIG. 25) there is used a structural material 70 made of a steel sheet having angular corrugations, to the back of which isocyanate foam material 71 is bonded.

Such roofing members q are placed on the outer angle steel members h and the extended supports h' with the ridge-like channels at right angles to the members h and h'. The roofing members are secured by bolts 73 and nuts 74, the bolts being inserted through holes 72 made previously in the outer angle steel members h, supports h', and roofing members q, after overlapping some of the ridge-like channels of adjacent roofing members. In this manner the roofing is finished.

In such roofing closing caps r are inserted in the spaces formed between the top rail and the roofing members q. This closing cap r is so shaped as to be set in each of the ridge-like channels of the roofing member and has flanged edges 75 bent outward. Thus, when the closing cap is inserted in the space between the top rail and the roofing member q, it is a force fit by help of such flanged edges 75 opening outwards together with the isocyanate foam material 71 on the inside of the roofing member acting as packing. Therefore, the closing cap may not be pushed farther inwards even when subjected to wind pressure.

A partition panel s (see FIGS. 28 and 29) is composed of vertical wooden frames 76, 76, window plates 35 set therein, which are the same as those made of synthetic resin used for the window panel j, and other wooden frames 77, 77 more slender than the vertical frames 76 secured at the upper and lower ends and retaining the window plates 35. The vertical frames 76 have grooves in which tongues of the window plates 35 fit as in the window panels. This partition panel s is inserted at the upper end into a channel of the ceiling frame n' and is held at the lower end by a clip t on the floor frame n. In this manner as many partition panels s are provided as required.

The clip t (see FIGS. 30 and 31) is formed by making two cuts in a square metal sheet from its two opposite sides respectively and bending right and left portions on the both sides downward and middle portions upward to make channels. The downward portions 78 are inserted and fixed on the floor frame n and the floor panel o, while the upward portions 79 hold the lower end of the partition panel s, when inserted therein.

Figure 32:
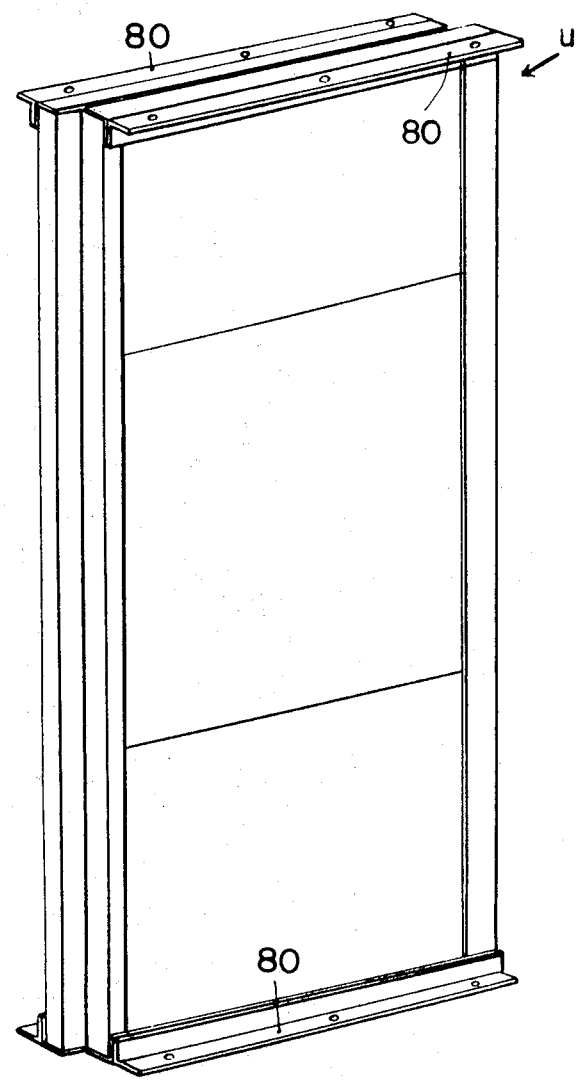
FIG. 32 is a perspective view of a permanent partition panel.

In addition to such temporary partition panels, a partition panel u (see FIG. 32) is provided for a permanent partition, which is the same in structure as the outer wall panel i but is covered on both sides with isocyanate foam material 23 and colored leather cloth 24 bonded thereto. The partition panel u is permanently installed by fixing upper and lower angle steel members 80 at one side with nails in position on the floor and ceiling and then fixing other upper and lower angle steel members 80 at other side in the same manner.

Individual sections of a prefabricated house constructed as has been described above, may be put on the market as a set.

A set of such sections is assembled into a prefabricated house as follows: Place and fix foundation stones z at a building site and put corner channel steel members a at four corners on the foundation stones z after unfolding them around the pin 1 of the hinge 2 to form a right angle. Let two corner channel steel members a abut end-to-end in the direction of depth of the house by aligning their respective channels and insert connecting channel steel members b therebetween in the direction of frontage by aligning their respective channels. Then attach inner and outer angle steel members c and d to the channel steel members for a groundsill, insert bolts 5 in holes 4, and fasten temporarily with nuts 6. Tighten the corner channel steel members a at four corners by inserting bolts 9 in holes 8 in the flange 7 of one outer angle member and the other outer angle member in contact therewith and fastening with nuts 10.

After completion of the assembling of the groundsill, insert, at each corner, two outer wall panels i for corner use (with lap joints formed in the same direction as shown in FIG. 13). In this case remove bolts 5 which had been inserted for temporary fastening. Let holes 56 made in the lower side of the outer wall panel $i$ meet with holes 4 of the angle steel members $c$ and $d$ and corner channel steel members $a$. Insert the bolts 5 therein from the inner angle steel member $c$ and fasten with nuts 6. In this way outer wall panels $i$ are first erected at each corner. Then, set up intermediate panels $i$, door panel $l$, window panel $j$, wiring panel $k$, and/or bookcase panel $m$, as required and fasten them to the groundsill as described above. Through bolts in holes 56 made in the upper side of outer wall panel $i$, window panel $j$, wiring panel $k$, and bookcase panel $m$ fasten such panels one by one to the top rail. In this way, such panels are fixed evenly at the upper and lower ends of equal intervals to the groundsill and the top rail.

Afer completion of fastening the panels to the groundsill and the top rail, start the flooring and ceiling work.

For the flooring, suspend floor frame $n$ between the inner angle steel members $c$ of the groundsill and set floor panels $o$ therein in close contact. For the ceiling suspend ceiling frames $n'$ between the unequal-sided angle steel members $g$ inside the top rail so as to face the floor frames $n$ (with channels of the ceiling frames $n'$ directed downward), and set ceiling panels $p$ on the frames in close contact. Then, place roofing members $q$, overlapping some ridges at joined portions, on angle steel members $h$ and stays $h'$ outside the top rail, insert bolts 73 in holes 72 made therein, and fasten with nuts 74. In spaces formed by the top rail and the ridges of the roofing members $q$ force fit closing caps $r$, making use of flanged edges 75 formed thereround and projecting outward, so that dust, sand, rain, water or snow is prevented from entering under the roof.

The roofing members $q$ are fixed on the angle steel members $h$ outside the top rail, that is, out of the room, and therefore, the room is protected from the leakage of rain through any of holes 72, even if leaking occurs owing to the isocyanate foam material 71 being damaged and made ineffective as packing. The assemblying work has now been finished. This work can be completed within five working hours by two persons using only spanners and hammers.

When it is necessary to partition the room, a partition panel $s$ is set up by setting the upper end in the ceiling frame $n'$ and holding the lower end on a clip $t$ between the floor frame $n$ and the floor panel $o$.

For a permanent partition, for example, to make a kitchen or toilet, a permanent partition panel $u$ is fixed by angle steel members 80 nailed to the floor and the ceiling.

Disassembly is done in a reverse way to the foregoing assembling work.

What is claimed is:

1. A prefabricated house comprising a goundsill formed of channel steel members put at four corners, each of which consists of two channel steel members cut at one end at 45° and by hinges at their cut ends so as to be folded and unfolded, connecting channel steel members joined between said corner channel steel members according to the desired building area, and angle steel members attached to the inner and outer sides thereof to join said channel steel members; a top rail formed of corner channel steel members joined like said corner members of the groundsill but facing downwardly toward said groundsill, unequal-sided angle steel members attached to the inner side thereof in a position lower than said corner channel steel members, and outer angle steel members attached to the outer side thereof and level therewith, to join said channel steel members of said top rail, said outer angle steel members being extended to form stays for roofing members; outer wall panels inserted into and fastened to said channels of said groundsill and said top rail at the lower and upper ends respectively with bolts and nuts, said bolts being inserted through holes extending through said angle members, said channel members and said panels, said panels including intermediate wall panels each comprising side frame members which are stepped to form lap joints, panel forming plates extending between said side frame members and a pair of facing angle members at each of the upper and lower ends of said panel secured to said side frames to retain said panel forming plates, at least one window panel of similar construction but with windows replacing at least one of said panel forming plates, and at least one door panel but with a hinged door and a transom replacing said panel forming plates; floor frames each being formed of a channel steel having laterally projecting flanges formed integrally on both sides, arranged at specific intervals between the inner angle steel members of the groundsill; floor panels set closely to each other between said floor frames; ceiling frames being the same in shape as said floor frames and put on the inner unequal-sides angle steel members of the top rail, facing said floor frames; ceiling panels set closely to each other between said ceiling frames; roofing members each being composed of a metal sheet bent in section of trapezoidal cross sectional shape fixed to the outer angle steel members of the top rail with bolts and nuts; and partition panels inserted into channels of the ceiling frames at the upper end and held by clips on the floor frames at the lower end.

2. A prefabricated house as claimed in claim 1 in which each of said intermediate outer wall panels is composed of channel frames at both sides each having a lap joint formed on the side face thereof and three panel forming plates set in the channels of said frames, each of said panel forming plates consisting of a wooden frame, waterproof plywood sheets attached to its both surfaces with a metal sheet covering the outer surface and foam material with flexible sheet material bonded thereto covering the inner surface, said frames and said panel forming plates having edges joined at the upper and lower ends of said panels.

3. A prefabricated house as claimed in claim 2 in which said window panel is like said intermediate outer wall panel but with the middle panel forming plate replaced by a window frame.

4. A prefabricated house as claimed in claim 2, in which electric wiring extends through spaces formed inside the lap joint portions of the frames of the outer wall panels and in which wiring fixtures are suitably mounted on the frames.

5. A prefabricated house as claimed in claim 1 in which an outer wall panel to be used as a bookcase panel is formed by removing the middle panel forming plate and replacing it by a bookcase set in said side frames in such manner that it projects outwardly of the outer wall panel.

6. A prefabricated house as claimed in claim 1 in which said panel forming plates of said wall panels are covered on the outer side with sheet metal and on the inner side with foam plastic covered with decorative sheet material.

7. A prefabricated house as claimed in claim 1 in which each of said floor panels is composed of a wooden frame having waterproof plywood sheets attached to its both surfaces, a metal sheet covering the back surface, and surfacing material covering the inner surface facing the room.

8. A prefabricated house as claimed in claim 1 in which said roofing members have foam material bonded to the back surface thereof.

9. A prefabricated house as claimed in claim 1 in which said chips for a partition panel comprises a square metal plate having two straight cuts from the two opposite sides with right and left portions bent downward and a center portion bent upward so as to form upper and lower holding channels.

10. A prefabricated house as claimed in claim 1 in which a closing cap of synthetic resin fits into a space formed between the roofing members and the top rail to cover said space tightly by force fitting therein with edges formed around the cap directed outwardly.

11. A prefabricated house as claimed in claim 1 in which panes the window comprise hollow double windows and hollow blocks which are made of synthetic resin.

12. A prefabricated house as claimed in claim 1, in which said partition panels comprise side frames and hollow blocks of synthetic resin set between said side frames.

References Cited
UNITED STATES PATENTS

| | | | |
|---|---|---|---|
| 2,766,855 | 10/1956 | Johnson et al. | 52—204 |
| 3,088,558 | 5/1963 | Dickinson | 52—204 |

PATRICK D. LAWSON, Primary Examiner